Feb. 3, 1959 R. KAISER 2,872,216
GLOBE COCK COUPLING, MORE PARTICULARLY FOR FUELING
STATIONS SUPPLYING LIQUID FUELS
Filed March 29, 1957 3 Sheets-Sheet 1
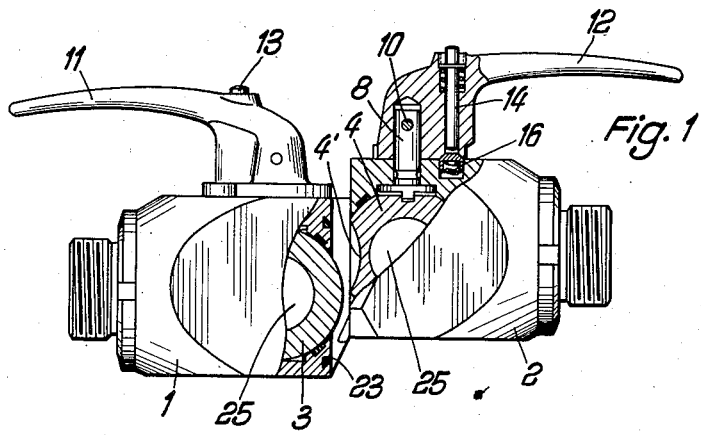
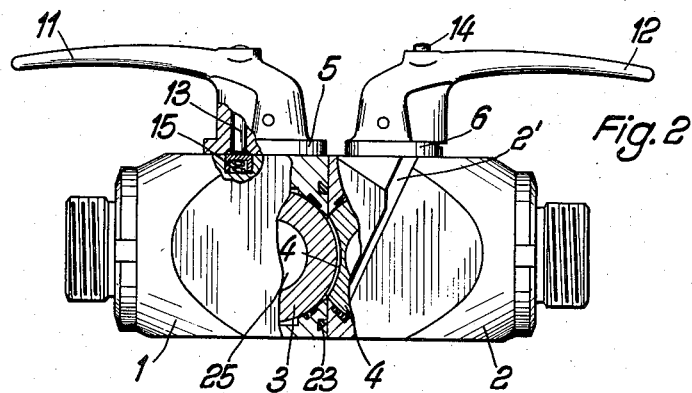
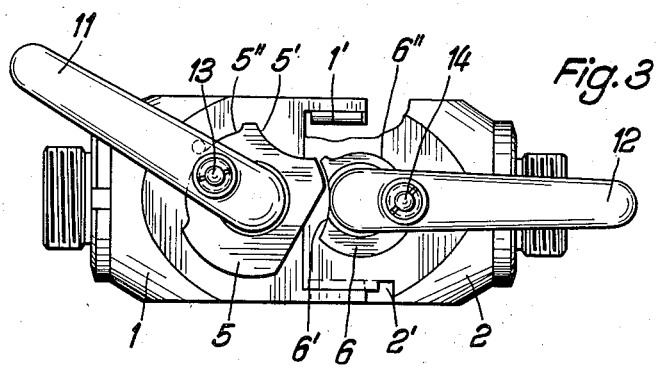
Inventor:
Rudolf Kaiser Inventor:
Rudolf Kaiser

United States Patent Office 2,872,216
Patented Feb. 3, 1959

2,872,216

GLOBE COCK COUPLING, MORE PARTICULARLY FOR FUELING STATIONS SUPPLYING LIQUID FUELS

Rudolf Kaiser, Ettlingen, Baden, Germany

Application March 29, 1957, Serial No. 649,351

Claims priority, application Germany January 25, 1957

5 Claims. (Cl. 284—9)

Filling stations supplying oil, petrol, liquefied gas etc. require hose couplings which prevent any fuel from being lost for example when tanker vehicles are being coupled to and uncoupled from the tank installations. In the long run, such losses are not only expensive, but they also contribute to soiling the vicinity of the filling stations, and are a nuisance to the attendants at these stations. Thus there is a need for pipeline couplings wherein the pipe ends are sealed in a foolproof manner before coupling and also before the said ends are parted.

Pipeline couplings are already known whose valves are positively opened in opposition to the force of closing springs during the coupling operation, and are automatically closed by spring force at the time of uncoupling. But these pipeline couplings have the disadvantage that the valve cones do not return to their initial positions upon uncoupling, owing to rust accumulation and soiling. There are also considerable deviations in the path of flow in these couplings, and flow losses are caused by the valve cones. In addition, the medium being conveyed flows about the sealing surfaces when the coupling is in the position corresponding to free throughflow. The object of the present invention is to provide a constructionally simple and robust pipeline coupling which is suitable more particularly for filling stations and can be operated easily and in a fool-proof manner, and which avoids the aforesaid disadvantages of the known couplings.

According to the present invention there is provided a globe cock coupling wherein each of the two pipe ends which are to be coupled together is adapted to be sealed in fluid-tight fashion by one globe cock, characterised in that connected to the actuating shafts of the globe cocks are locking discs which are formed with recesses and which permit coupling or uncoupling of the coupling halves only when both globe cocks are in the closure position. One coupling half can be provided with oblique lateral guide surfaces on which the coupling bars or pins situated on the other coupling half can slide into the coupling position, which is secured by the pivoting and engagement of the locking disc mounted on one coupling half over the other coupling half.

The hand control levers which are fixed to the globe cocks preferably perpendicularly to the passage extending therethrough, are elastically locked when the globe cocks are in the closure position. The pivoting range of said levers is limited in a manner known per se by recesses in the locking discs and by stop pins.

The locking disc of one coupling half, when the coupling position is secured, can engage under the slightly higher locking disc of the other coupling half or engage into a recess in the said disc. It is possible to screw to each side of one coupling half, locking plates for engaging the coupling pins which are fixed on both sides of the other coupling half.

Two examples of embodiment of the invention are illustrated in Figs. 1–10 of the accompanying drawings in various control positions and part sectional views; the first example of embodiment is illustrated in Figs. 1 to 6 and the second in Figs. 7–10.

Fig. 1 is a side view, partly in section taken on the axis of the coupling, of the coupling constructed according to the present invention, in the uncoupled condition.

Fig. 2 is the same view, with the coupling in the coupled condition.

Fig. 3 is a plan view of the coupling showing the handle of one globe cock pivoted out of the closure position; the right-hand coupling half is represented as partially broken away.

Figure 4:
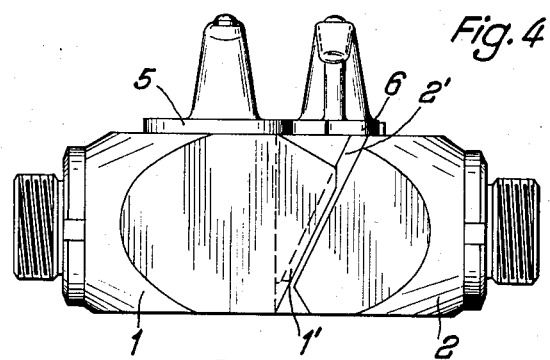
Fig. 4 is a side view of the coupling; the handles of both globe cocks have been pivoted outwards through 90°; in this position the stream of liquid can pass through the coupling.
Figure 5:
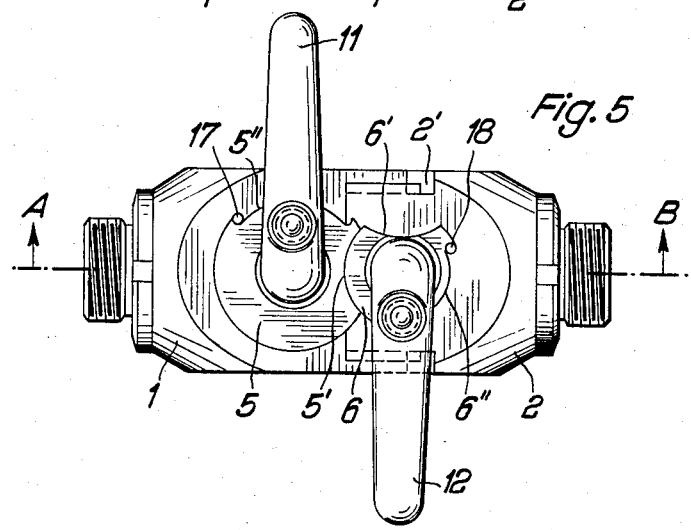
Fig. 5 is a plan view of the coupling in the same position.

In the figures the two coupling halves are designated as 1 and 2. One coupling half could be connected for example to a tank installation for liquid fuels and the other to a filling hose. The globe cock which closes the coupling half 1 consists of a globe plug 3 and an actuating shaft 7 which is connected fast to the control hand lever 11 by means of the pin 9. The control handle is provided with a locking disc 5, or is rigidly connected thereto. The globe cock consisting of the globe plug 4, actuating shaft 8 and hand lever 12 closes the coupling half 2. Through the intermediary of pressure discs, compression springs which are not shown in the drawings urge both globe plugs against the valve seat. The hand lever 12 is provided with a locking disc 6 and is connected to the actuating shaft 8 by means of the pin 10.

The hand levers 11 and 12 are held fast by means of elastic locking studs 15 and 16 in the closure position of the globe plugs 3 and 4 which is illustrated in Figs. 1 and 2. As the aforesaid figures show, these locking studs consist of sleeves with a frusto-conical head piece. The latter is pressed by a compression spring into a correspondingly shaped recess in the base plate of the handle lever 11 or 12 respectively. When the hand levers are to be swung out of the neutral position illustrated in Figs. 1 and 2, pressure must be exerted on the end of the spring-loaded pin 13 or 14 respectively which is guided in a bore in the hand lever, said end projecting out of the said hand lever. As a result, the locking studs 15 and 16 are rendered inoperative.

Figure 6:
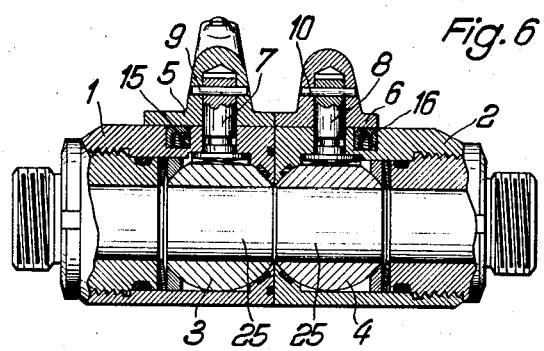
Fig. 6 is a sectional view on the line A—B of Fig. 5.
Figure 7:
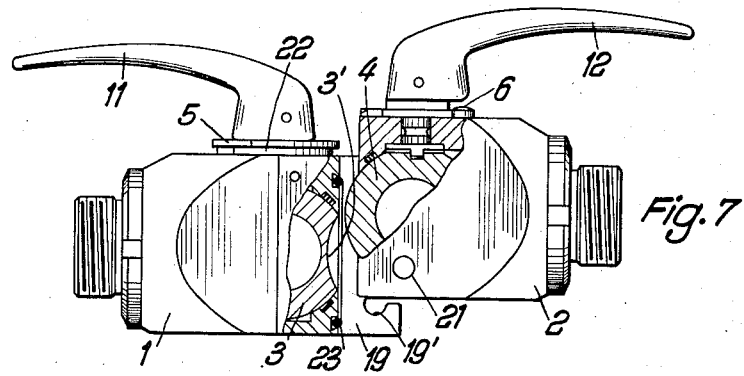
Fig. 7 is a side view, partly in a sectional view taken on the coupling axis, of the second example of embodiment when in the uncoupled condition.
Figure 8:
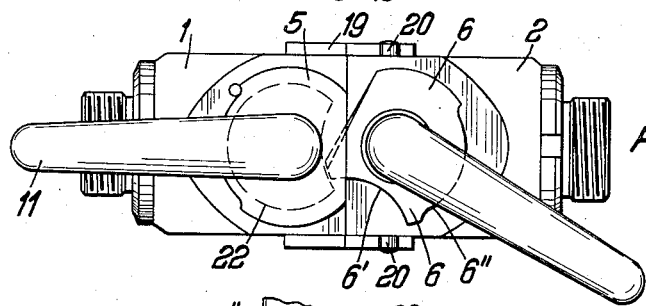
Figs. 8 and 9 are plan views of the coupling halves of the same example of embodiment fitted together, showing various positions of the hand levers when swung out of the closure position.

As Figs. 2 to 5 show, the coupling half 1 is provided, in axial prolongation of each of its two side walls, with an inwardly directed bar 1' which extends at an acute angle relatively to the axis of the actuating shaft 7. When the coupling halves 1 and 2 are fitted together, correspondingly shaped bars 2' of the coupling half 2 slide on the said bars 1'. Fig. 2 shows that after the two coupling halves have been fitted together the globe plug 3 engages into a cup-shaped recess 4' in the globe plug 4. This has the result that the globe plug 3 must first of all be brought to the position illustrated on Figs. 4 to 6 before the globe plug 4 can be brought into the same "open" position by pivoting the handle 12.

The two coupling halves are sealed from the exterior by the sealing ring 23, so that the liquid flowing through the bores 25 in the globe plugs 3 and 4 cannot issue between the coupling halves.

Fig. 3 shows that when the hand lever 11 is pivoted outwards, the locking disc 5 which is rigidly connected to the said hand lever engages over the upper surface of the coupling half 2. The coupling half 2 is thereby locked in its coupling position. The range of pivoting of the hand lever 11 is limited by the radial recess 5" in the locking disc 5 and by the stop pin 17. The radial recess 6" in the locking disc 6 and the stop pin 18 limit the range of pivoting of the hand lever 12.

The last-mentioned locking disc comprises peripherally a further arcuate recess 6' the centre of whose circle lies on the axis of the actuating shaft 7 of the globe plug 3. As Fig. 3 shows, the radius of the recess 6' is only slightly larger than the radius of the periphery of the locking disc 5. The recess 6' is necessary in order that the hand lever 11 which is rigidly connected to the locking disc 5 can be swung out at all from its closure position.

The locking disc 5 also comprises an arcuate recess 5' the centre of whose circle lies on the axis of the actuating shaft 8 of the globe plug 4. The radius of the recess 5' is only slightly larger than the radius of the periphery of the locking disc 6. Before the hand lever 12 can be swung out of the open position illustrated in Fig. 5 in the counterclockwise direction into the closure position of the globe plug 4, the hand lever 11 cannot be swung out into the position corresponding to closure of the globe plug 3 as is illustrated in Figs. 1 and 2. Only when this has happened does the locking disc 5 release the coupling half 2 for uncoupling. Thus the two coupling halves can only be detached from one another if both globe cocks are closed.

The example of embodiment illustrated in Figs. 7 to 10 differs from the example of embodiment described hereinbefore with reference to Figs. 1 to 6 essentially in that instead of the sloping coupling bars 1' and 2', locking plates 19 are used which are screwed one on each side of one coupling half, coupling pins 20 and 21 fixed on the sides of the other coupling half latching into the recesses 19' in the said plates 19. In this way the manufacture of the coupling halves is simplified and therefore made less expensive.

Figs. 7 to 10 show that the locking plates 19 are screwed on to each side of the coupling half 1 by means of the screws 24. The plates 19, which project laterally beyond the said coupling half, comprise sloping guide edges 19" which correspond to the bars 1' in the example of embodiment illustrated in Figs. 1 to 6. When the coupling halves 1 and 2 are fitted together, the coupling pins 21 slide along the guide edges 19" until the said pins and the second pair of coupling pins 20 engage in the recesses 19' of the plates 19.

In the example of embodiment according to Figs. 7–10, the globe plug 3 is provided with a cup-shaped recess 3' into which engages the globe plug 4 after the coupling halves have been fitted together. Therefore for opening the globe cocks after the coupling operation, the handle lever 12 must first of all be pivoted in the clockwise direction out of the closure position into the open position. In the course of this pivoting movement, the locking disc 6 which is rigidly connected to the hand lever 12 is slid under the somewhat higher-positioned locking disc 5 of the handle lever 11, or into a recess 22 of the latter disc. The coupling is thereby locked in position. The outline of the recess 22 is indicated in chain lines in Figs. 8 and 9.

The arcuate recess 5' of the locking disc 5 of the first example of embodiment (cf. Figs. 3 and 5) corresponds to the arcuate depression 22' in the recess 22. The arcuate recess 6' of the locking disc 6 has a radius which is slightly greater than the radius of the recess 22. As in the case of the example of embodiment according to Figs. 1 to 6, the ranges through which the handle levers 11 and 12 can pivot are similarly limited by the radial recesses 5" and 6" of the locking discs 5 and 6 and also by the stop pins 17 and 18.

Figure 9:
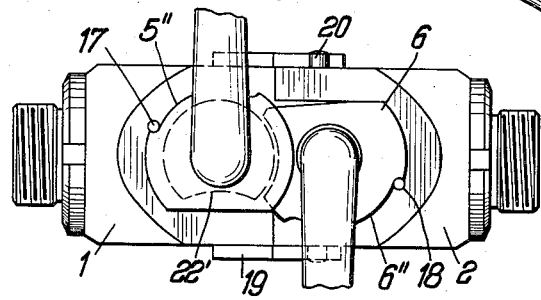
Figure 10:
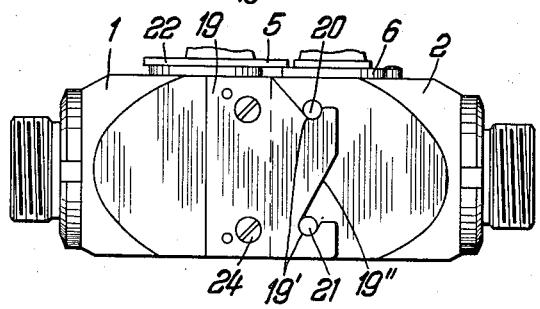
Fig. 10 is a side view of the second example of embodiment corresponding to the hand lever position shown in Fig. 9.

As can be seen from the locking position shown in Fig. 9, before uncoupling is effected the hand lever 11 must first of all be pivoted counter-clockwise into its closure position, in which the stop pin 17 bears against the right-hand corner of the radial recess 5". Only then can the hand lever 12 also be pivoted back into its closure position.

I claim:

1. A globe cock coupling for connecting together two pipe ends, said coupling comprising two halves adapted to be coupled together or uncoupled, coupling means for releasably coupling said two halves comprising opposite lateral oblique guides formed on one coupling half and guide engaging means therefor on the other half, and releasable locking means, a globe cock in each of said halves, the globe cock of the said other coupling half having a spherical depression to receive the globe cock of said one coupling half, one cock for each pipe for closing the same in a fluid-tight manner when the pipe ends are disconnected from one another, an actuating shaft on each cock, a disc connected with each shaft, said releasable locking means comprising an extension formed on the disc of the shaft of said one coupling half overlapping and engaging the external surface of the other half when the halves are coupled and each disc having a recess, the said discs only allowing the coupling halves to be coupled or uncoupled when both globe cocks are in the closure position.

2. A globe cock coupling as claimed in claim 1, each of said guides including a guide surface, said engaging means comprising a coupling bar on the other coupling half slidable against said guide surface into the coupling position, said coupling halves being locked in coupling position by turning the locking disc on one coupling half having said extension and thereby engaging said disc over the other coupling half.

3. A globe cock coupling as claimed in claim 1, said engaging means comprising coupling pins on the other coupling half slidable against said guides into the coupling position, said coupling halves being locked in coupling position by turning the locking disc on one coupling half having said extension and thereby engaging said disc over the other coupling half.

4. A globe cock coupling as claimed in claim 1, wherein the disc of one coupling half is positioned slightly higher than the disc of the other coupling half, one disc engaging under the other disc for locking the two halves in the coupling position.

5. A globe cock coupling as claimed in claim 1, said engaging means comprising coupling pins on said other coupling half and said coupling means including locking plates screwed on each side of the said one coupling half and engaging said pins in the coupling position, the locking disc of said one half engaging with its extension over the locking disc of the other half to lock the two halves in the coupling position.

References Cited in the file of this patent

UNITED STATES PATENTS

| | | |
|---|---|---|
| 407,456 | Williams | July 23, 1889 |
| 881,830 | Skerman | Mar. 10, 1908 |
| 1,428,933 | Bean | Sept. 12, 1922 |
| 1,495,516 | Hobart | May 27, 1924 |
| 2,376,803 | Mower et al. | May 22, 1945 |